(12) United States Patent
Zhang et al.

(10) Patent No.: US 11,695,294 B1
(45) Date of Patent: Jul. 4, 2023

(54) POWER REGULATION APPARATUS, DUAL-BATTERY CHARGING APPARATUS AND CHARGING CURRENT REGULATION METHOD

(71) Applicant: NuVolta Technologies (Hefei) Co., Ltd., Hefei (CN)

(72) Inventors: Junhe Zhang, Shanghai (CN); Fuchun Zhan, Shanghai (CN); Juan Li, Shanghai (CN); Kunxu Zhu, Shanghai (CN); Zhiying Chen, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 0 days.

(21) Appl. No.: 18/085,132

(22) Filed: Dec. 20, 2022

(30) Foreign Application Priority Data

Jul. 19, 2022 (CN) .......................... 202210847643.4

(51) Int. Cl.
*H02J 7/00* (2006.01)
*G05F 1/56* (2006.01)

(52) U.S. Cl.
CPC .......... *H02J 7/007182* (2020.01); *G05F 1/56* (2013.01); *H02J 7/0013* (2013.01); *H02J 2207/20* (2020.01); *H02J 2207/50* (2020.01)

(58) Field of Classification Search
CPC ............... H02J 7/007182; H02J 7/0013; H02J 2207/20; H02J 2207/50; G05F 1/56
(Continued)

(56) References Cited

U.S. PATENT DOCUMENTS 6,016,017 A * 1/2000 Kadanka ................. H02J 9/061
307/64
6,879,113 B2 * 4/2005 Nemirow ........... H05B 41/2856
315/246
(Continued)

FOREIGN PATENT DOCUMENTS

CN 201203812 Y 3/2009
CN 103296717 A 9/2013
(Continued)

OTHER PUBLICATIONS

Y. Sugimoto, "A 1.5-V current-mode CMOS sample-and-hold IC with 57-dB S/N at 20 MS/s and 54-dB S/N at 30 MS/s," in IEEE Journal of Solid-State Circuits, vol. 36, No. 4, pp. 696-700, Apr. 2001, doi: 10.1109/4.913749. (Year: 2001).*

*Primary Examiner* — M Baye Diao
(74) *Attorney, Agent, or Firm* — Li Li; AP3 Law Firm PLLC

(57) ABSTRACT

A power regulation apparatus includes a first switch and a switch control signal generation unit including a first transconductance unit including a first input terminal for receiving a first voltage from a first terminal of the first switch, a second input terminal for receiving a second voltage from a second terminal of the first switch, and an output terminal for being connected to a first node, a node voltage generation unit connected to the first node and configured to generate a node voltage signal at the first node, and a second transconductance unit including a first input terminal for receiving a current characterization signal characterizing a current flowing through the first switch, a second input terminal for being connected to the first node so as to receive the node voltage signal, and an output terminal for being connected to a control terminal of the first switch.

17 Claims, 7 Drawing Sheets

(58) Field of Classification Search
USPC .......................................................... 320/162
See application file for complete search history.

(56) References Cited

U.S. PATENT DOCUMENTS

| | | | | |
|---|---|---|---|---|
| 8,018,200 | B2 * | 9/2011 | Enjalbert | H01M 10/44 320/136 |
| 8,279,631 | B2 * | 10/2012 | Yang | H02M 3/33507 363/21.17 |
| 8,350,534 | B2 * | 1/2013 | Niculae | H02J 7/04 320/162 |
| 8,810,209 | B2 * | 8/2014 | Zhu | H02J 7/02 320/140 |
| 9,035,496 | B2 * | 5/2015 | Kang | H02J 1/10 320/120 |
| 10,804,802 | B2 * | 10/2020 | Dalena | H02J 7/00 |
| 11,239,677 | B2 * | 2/2022 | Lim | H02J 7/0013 |
| 11,456,611 | B2 * | 9/2022 | Gambetta | H02J 7/02 |
| 2010/0244784 | A1 * | 9/2010 | Li | H02J 7/007182 327/331 |

FOREIGN PATENT DOCUMENTS

| | | | | | |
|---|---|---|---|---|---|
| CN | 113364106 A | | 9/2021 | | |
| GB | 1585915 A | * | 3/1981 | ............ | H02J 7/1423 |
| JP | 2004274849 A | * | 9/2004 | ............ | Y02E 60/10 |

* cited by examiner

US 11,695,294 B1

POWER REGULATION APPARATUS, DUAL-BATTERY CHARGING APPARATUS AND CHARGING CURRENT REGULATION METHOD

PRIORITY CLAIM

This disclosure claims the benefit of and priority to Chinese patent Application No. 202210847643.4, filed on Jul. 19, 2022, which is hereby incorporated by reference in its entirety.

TECHNICAL FIELD

The present invention relates to the field of power supplies, and in particular relates to a power regulation apparatus, a dual-battery charging apparatus, and a charging current regulation method.

BACKGROUND

As technology continues to advance, various electronic devices, such as portable devices (including cell phones, tablet computers, digital cameras, MP3 players, watches, and/or other similar electronic devices) have become popular. Each electronic device may employ a plurality of chargeable battery units which are connected in series and/or in parallel to form a chargeable battery for storing electrical energy. The chargeable battery can be charged by an adapter connected to the electronic device and a power conversion structure in the electronic device, thus recovering the energy of the battery.

With the pursuit of miniaturized and portable electronic devices in the market, flip or foldable electronic devices, such as flip or foldable smart phones, will be the next competing hotspot. In the foldable electronic devices, dual-batteries connected in parallel is a popular solution, which can make the maximum use of the space.

In the dual-batteries connected in parallel solution, batteries of different sizes are generally employed, i.e., the capacity of one of the batteries is greater than the capacity of the other battery. For the parallel connection of batteries of different sizes, it is necessary to regulate the charging current of each battery, which is also a problem of the current dual-batteries connected in parallel solution.

One feasible solution is to add an adjustable load switch to the small capacity battery side to limit the charging current. However, the voltage difference between the two batteries and the charging current of the small capacity battery can generate power consumption on the load switch, leading to high heat generation of the load switch. In order to protect the load switch from thermal faults, thermal regulation can be carried out, but the slow speed of thermal regulation cannot meet the demand.

Therefore, the power regulation apparatus and method for a load switch are urgently needed in the industry, such that the power regulation of the load switch is flexible, the response speed is high, and the power is close to an ideal power curve.

SUMMARY

The present invention provides a power regulation apparatus, including: a first switch; and a switch control signal generation unit, including: a first transconductance unit, including a first input terminal for receiving a first voltage from a first terminal of the first switch, a second input terminal for receiving a second voltage from a second terminal of the first switch, and an output terminal for being connected to a first node; a node voltage generation unit, connected to the first node and configured to generate a node voltage signal at the first node; and a second transconductance unit, including a first input terminal for receiving a current characterization signal characterizing a current flowing through the first switch, a second input terminal for being connected to the first node to receive a node voltage signal, and an output terminal for being connected to a control terminal of the first switch.

The present invention further provides a dual-battery charging apparatus, including: a first converter, including an input terminal receiving a bus voltage, and an output terminal connected to a first battery; and a second converter, including an input terminal receiving a bus voltage and an output terminal connected to the first battery. The output terminal of the first converter and the output terminal of the second converter are connected to a second battery via the power regulation apparatus.

The present invention further provides a charging current regulation method, including: in a battery system including the first battery and the second battery connected in parallel, receiving a first voltage of a first battery and a second voltage of a second battery, and converting a voltage difference between the first voltage and the second voltage into a first current signal; converting the first current signal into a node voltage signal; receiving a current characterization signal characterizing a battery charging current and the node voltage signal, outputting a switch control signal for controlling a first switch, and enabling the power generated by the first switch to be constant power, where the first switch is connected between the first battery and the second battery.

DETAILED DESCRIPTION OF ILLUSTRATIVE EMBODIMENTS

The following clearly and completely describes the technical solutions in the present invention with reference to the accompanying drawings. Apparently, the described embodiments are merely a part rather than all of the embodiments of the present invention. All other embodiments obtained by those of ordinary skill in the art based on the embodiments of the present invention without creative efforts shall fall within the protection scope of the present invention In an embodiment of the present invention, a power regulation apparatus is provided. Specifically, refer to a schematic diagram of a power regulation apparatus of a switch in accordance with an embodiment of the present invention shown in FIG. 1, the power regulation apparatus 100 includes a first switch SL, a switch control signal generation unit 10 including a first transconductance unit Gm1, including a first input terminal d11 for receiving a first voltage V1 from a first terminal of the first switch SL, a second input terminal d12 for receiving a second voltage V2 from a second terminal of the first switch SL, and an output terminal d13 for being connected to a first node node1, a node voltage generation unit 11 connected to the first node node1 and configured to generate a node voltage signal Vnode1 at the first node node1, and a second transconductance unit Gm2, including a first input terminal d21 for receiving a current characterization signal Vd21 characterizing a current I1 flowing through the first switch SL, a second input terminal d22 for being connected to the first node node1 so as to receive the node voltage signal Vnode1, and an output terminal d23 for being connected to a control terminal of the first switch SL.

The node voltage generation unit 11 is configured such that the node voltage signal Vnode1 generated at the first node node1 is adjustable.

Figure 1:
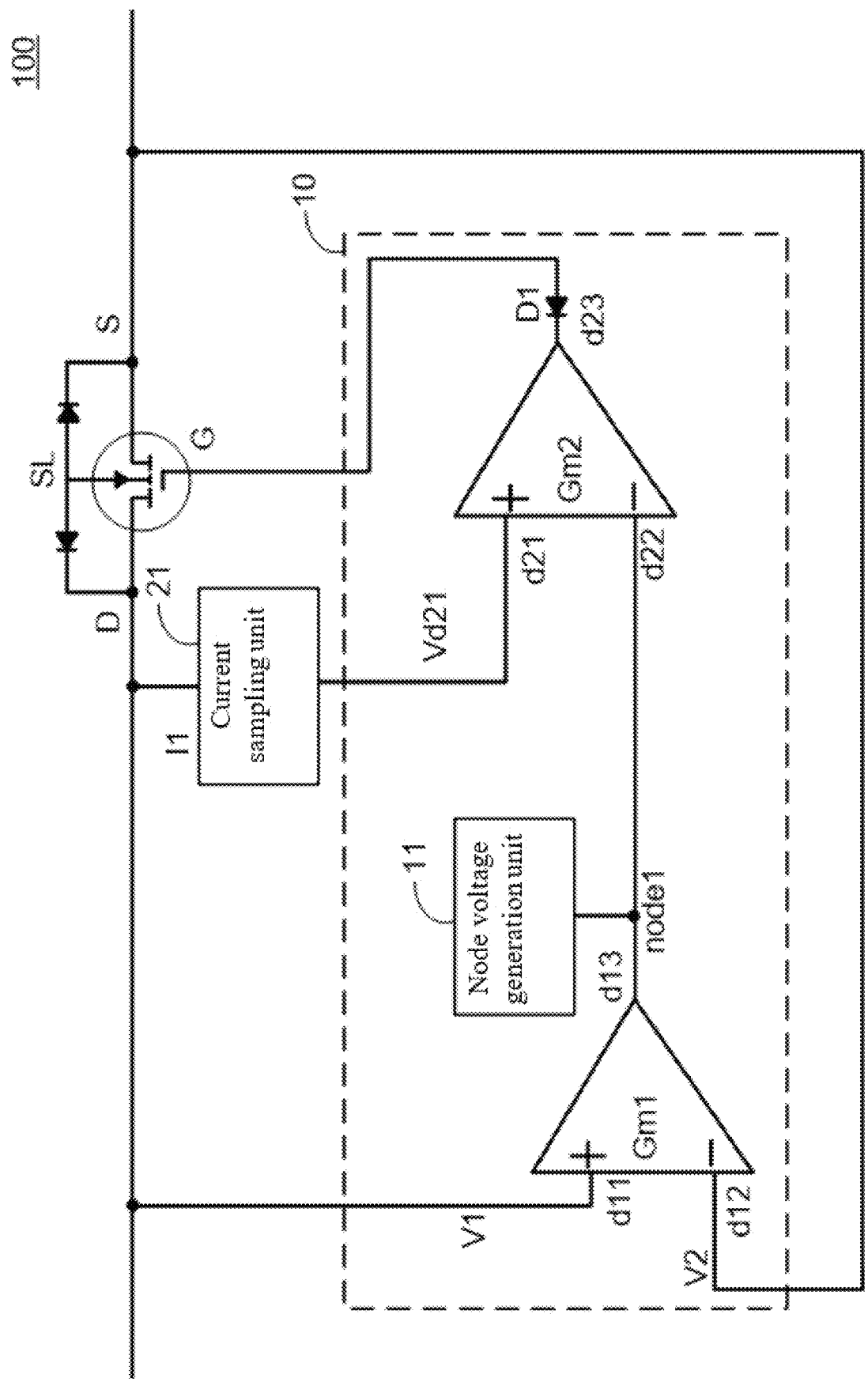
FIG. 1 is a schematic diagram of a power regulation apparatus in accordance with an embodiment of the present invention.

The current characterization signal Vd21 is proportional to the current I1 flowing through the first switch SL. In an embodiment, as shown in FIG. 1, a current sampling signal characterizing the current I1 flowing through the first switch SL is obtained through the sampling of a current sampling unit 21, and the current sampling signal serves as the current characterization signal Vd21. Thus, Vd21 is proportional to a sampling coefficient m of the current sampling unit 21. Certainly, the current characterization signal Vd21 can also be obtained by means of any other feasible ways, which are not limited by the present application.

It can be known from the characteristics of transconductance that a voltage difference between a first voltage V1 and a second voltage V2 is converted, by the first transconductance unit Gm1, into a first current signal. The first current signal is converted, by the node voltage generation unit 11, into a node voltage signal Vnode1, thereby obtaining the voltage difference between the first voltage V1 and the second voltage V2, i.e., the voltage difference between the two terminals of the first switch SL.

For a second transconductance unit Gm2, according to the characteristics of transconductance and the control principle of the switch control signal generation unit 10, Vd21 is equal to Vnode1, such that the current I1 flowing through the first switch SL is proportional to the node voltage signal Vnode1 (i.e., the voltage difference between the two terminals of the first switch SL). As the node voltage generation unit 11 is configured such that the node voltage signal generated at the first node node1 is adjustable, a plurality of proportional line segments of the voltage difference between the two terminals of the first switch SL and the current I1 flowing through the first switch SL can be obtained by regulating the value of the node voltage signal Vnode1, and a power line of the first switch SL can be formed by combining the plurality of the proportion line segments. Furthermore, the power line of the first switch SL can be flexibly regulated by regulating the node voltage signal Vnode1 so as to be close to an ideal power curve. Such solution is a power regulation solution. Thus, the response speed is faster.

According to the power regulation apparatus 100 shown in FIG. 1, the output terminal d23 of the second transconductance unit Gm2 generates a control signal for controlling the first switch SL, such as controlling a conduction degree of the first switch SL and then to control the current I1 flowing through the first switch SL, thereby regulating the current I1 flowing through the first switch SL, and the power generated by the first switch SL is achieved, and finally making the power generated by the first switch SL be the constant power.

Figure 2:
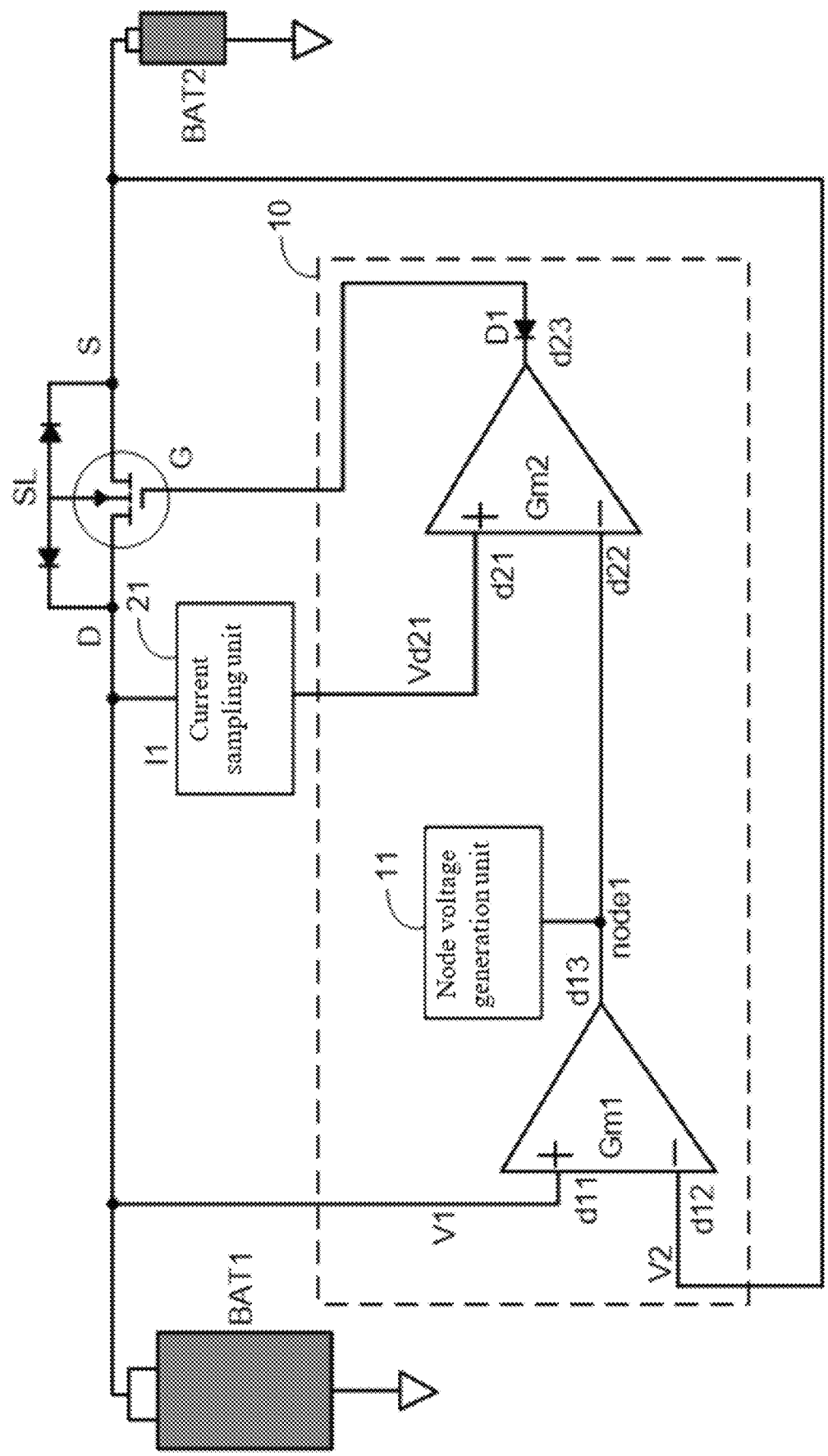
FIG. 2 is a partial schematic diagram of a dual-battery charging apparatus including the power regulation apparatus shown in FIG. 1 in accordance with an embodiment of the present invention.

The power regulation apparatus 100 above may be used in a dual-battery charging apparatus, specifically for a battery system including a first battery and a second battery connected in parallel. FIG. 2 shows a partial schematic diagram of a dual-battery charging apparatus including the power regulation apparatus shown in FIG. 1 in accordance with an embodiment of the present invention. A first battery BAT1 is connected to a first terminal of a first switch SL, and a first voltage V1 denotes a voltage of the first battery BAT1. A second battery BAT2 is connected to a second terminal of the first switch SL, and a second voltage V2 denotes a voltage of the second battery BAT2. Then, the regulation of a current I1 flowing through the first switch SL is the regulation of a charging current of the second battery BAT2.

Figure 3:
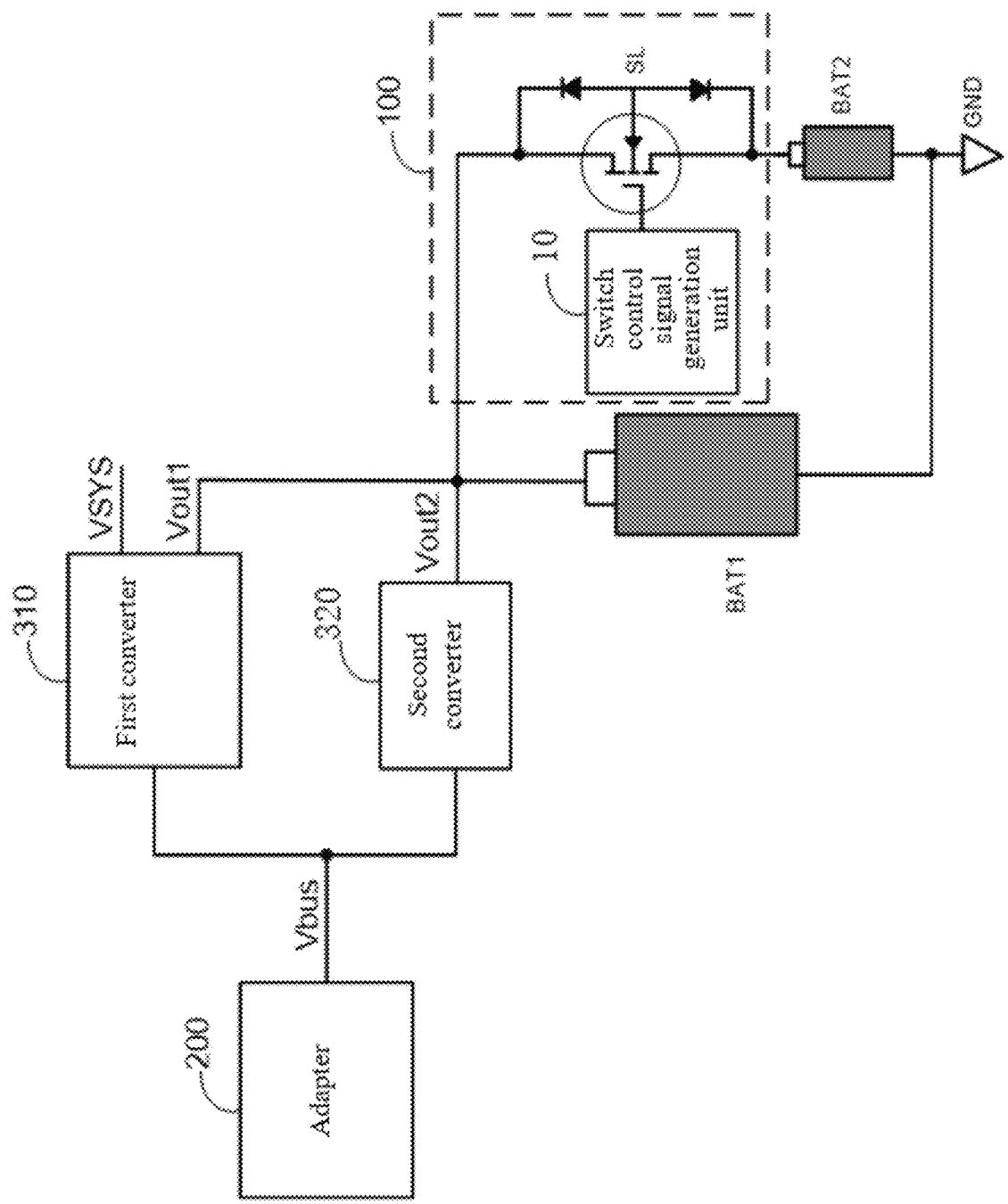
FIG. 3 is a schematic diagram of a dual-battery charging apparatus including the power regulation apparatus shown in FIG. 1 in accordance with an embodiment of the present invention.

FIG. 3 illustrates a schematic diagram of a dual-battery charging apparatus including the power regulation apparatus shown in FIG. 1 in accordance with an embodiment of the present invention. The dual-battery charging apparatus includes a first converter 310 including an input terminal for receiving a bus voltage Vbus, and an output terminal Vout1 for being connected to the first battery BAT1, and a second converter 320 including an input terminal for receiving the bus voltage Vbus, and an output terminal Vout2 connected to the first battery. The output terminal Vout1 of the first converter 310 and the output terminal Vout2 of the second converter 320 are connected to the second battery BAT2 via the power regulation apparatus 100 in FIG. 1. In the charging process of the first battery BAT1 and the second battery BAT2, such as in a trickle charging stage, a pre-charging stage, a constant-current charging stage, a constant-voltage charging stage and a charging termination stage, the charging current of the second battery BAT2 and the power of the first switch SL are regulated at the same time.

In an embodiment of the present invention, the capacity of the first battery BAT1 is larger than that of the second battery BAT2. That is, the power regulation apparatus 100 is generally connected to the small-capacity battery side.

In an embodiment of the present invention, the first converter 310 is a step-down converter, such as a buck converter. The second converter 320 is a switched capacitor converter. In an embodiment of practical applications, the first converter 310 is configured to perform trickle charging, pre-charging, constant-voltage charging and charging termination on the first battery BAT1 and the second battery BAT2. The second converter 320 is configured to perform constant-current charging on the first battery BAT1 and the second battery BAT2. That is, the charging current of the second battery BAT2 and the power of the first switch SL are regulated at the same time in the whole charging process of the battery.

The first converter 310 further includes a system output terminal VSYS for supplying power to a load.

In an embodiment of the present invention, as shown in FIG. 2, the first switch SL is a MOSFET (Metal-Oxide-Semiconductor Field-Effect Transistor). A drain D of the MOSFET is connected to the first battery BAT1. A source S of the MOSFET is connected to the second battery BAT2. A gate G of the MOSFET is configured to receive a switch control signal generated by a switch control signal generation unit 10. Certainly, the first switch SL may also be a bipolar junction transistor, a super-junction transistor, an insulated gate bipolar transistor, a GaN-based power device, and/or a similar device. If a device in the industry can be turned on or turned off by receiving a switch control signal, this device is acceptable.

Figure 4:
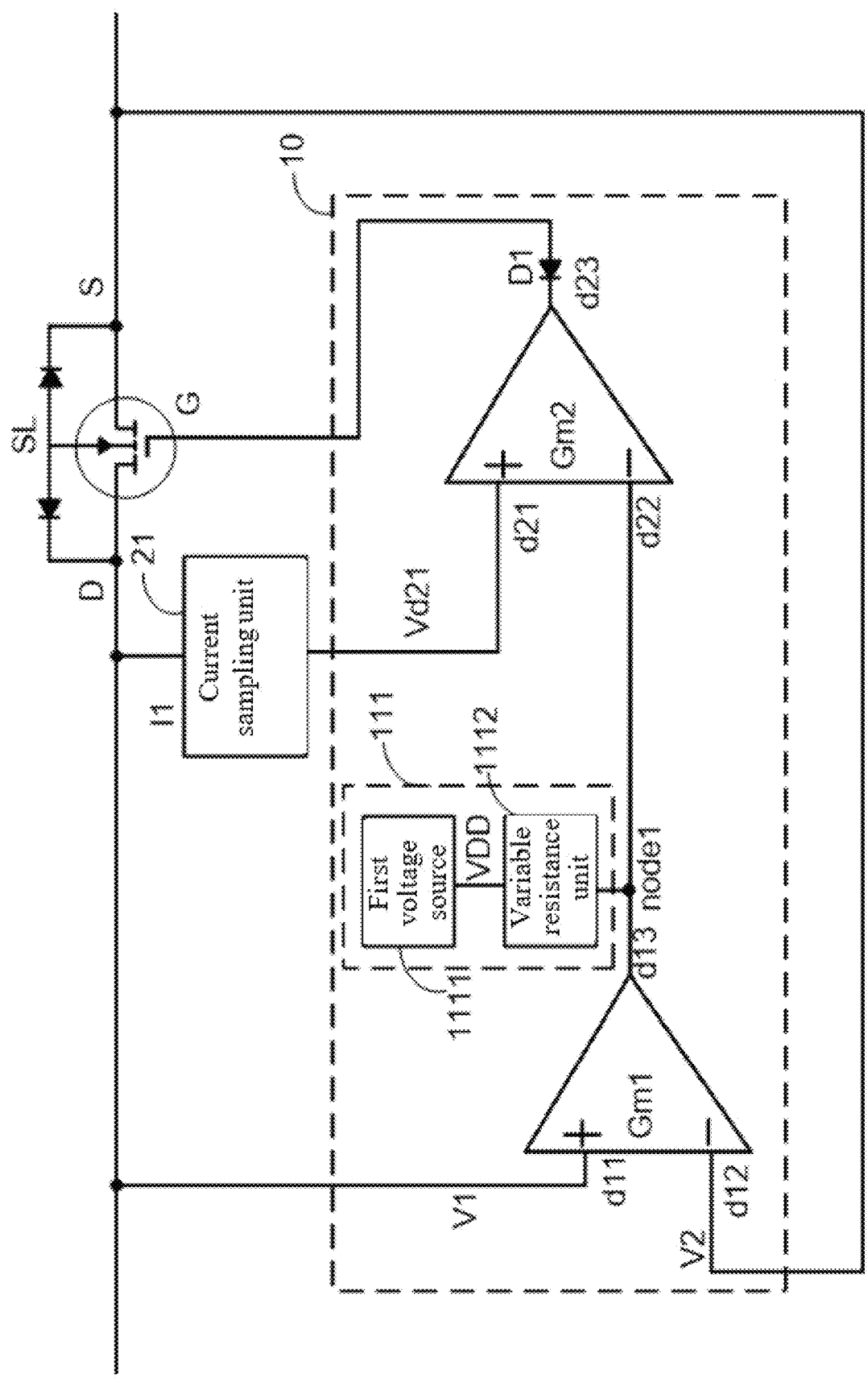
FIG. 4 is a detailed schematic diagram of a power regulation apparatus of a switch in accordance with a first embodiment of the present invention.

In an embodiment of the present invention, FIG. 4 illustrates a detailed schematic diagram of a power regulation apparatus of a switch in accordance with a first embodiment of the present invention. The node voltage generation unit 11 in FIG. 1 is a node voltage generation unit 111 shown in FIG. 4. The node voltage generation unit 111 includes a first voltage source 1111 configured to generate an adjustable voltage VDD and a variable resistance unit 1112 connected between the first voltage source 1111 and a first node node1. A resistance value of the variable resistance unit 1112 is adjustable. As above, a voltage difference between a first voltage V1 and a second voltage V2 is converted, by a first transconductance unit Gm1, into a first current signal IG1, IG1=(V1−V2)×G1. G1 is a transconductance value of the first transconductance unit Gm1. The first current signal IG1 is converted, by the node voltage generation unit 111, into a voltage signal, while a voltage signal is generated at the first node node1. The node voltage signal Vnode1=VDD−VR=VDD−(V1−V2)×G1×R. R is an equivalent impedance of the variable resistance unit 1112. That is, the first current signal IG1 is converted into the node voltage signal Vnode1 through a series connection of the first voltage source 1111 and the variable resistance unit 1112. At the moment, Vd21=Vnode1=VDD−(V1−V2)×G1×R.

Figure 5:
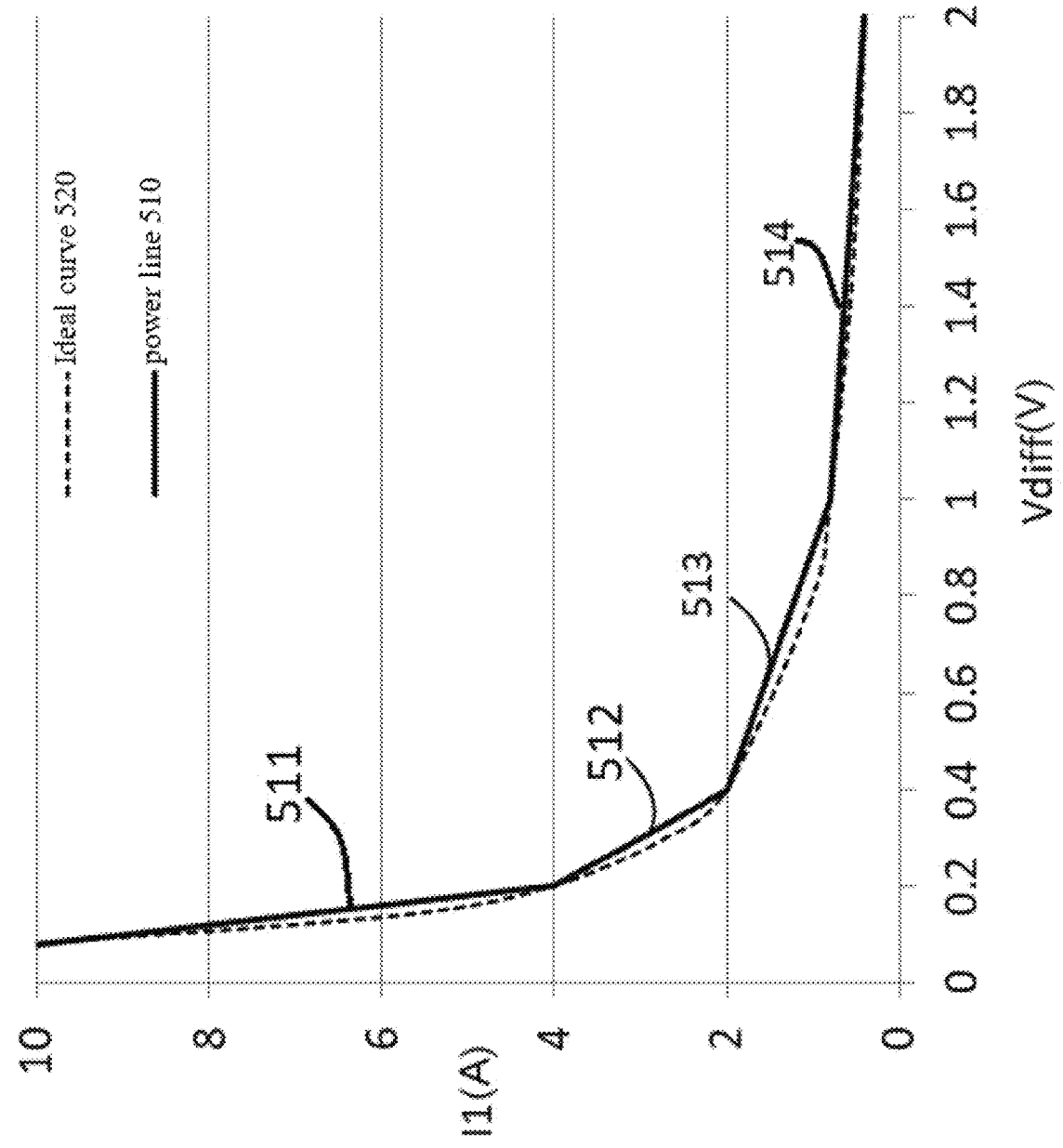
FIG. 5 is a schematic diagram of a power line formed by the power regulating device in FIG. 4 and an ideal power curve.

It can be known from Equation Vd21=Vnode1=VDD−(V1−V2)×G1×R that the node voltage signal Vnode1 can be adjusted by adjusting a voltage value of the adjustable voltage VDD generated by the first voltage source 1111 and a resistance value R of the variable resistance unit 1112. Meanwhile, a set of the adjustable voltage VDD and the resistance value R form a decreasing line segment. A plurality of sets of adjustable voltages VDD and the resistance values Rare formed through adjustments. Then, a plurality of decreasing line segments can be formed. Thus, a power line of the first switch SL can be formed by combining the plurality of decreasing line segments. FIG.5 illustrates a schematic diagram of a power line formed by the power regulation apparatus in FIG. 4 and an ideal power curve. The horizontal axis represents the voltage difference Vdiff between the two terminals of the first switch SL. The vertical axis represents the current I1 flowing through the first switch SL. As shown in FIG. 5, four sets of adjustable voltages VDD and resistance values R form four decreasing line segments 511, 512, 513 and 514 respectively. The four decreasing line segments are combined to form the power line 510 of the first switch SL, and the curve labeled 520 is an ideal power curve. It can be known from FIG. 5 that the power line 510 formed by employing the power regulation apparatus of the present application substantially coincides with the ideal power curve 520. Thus, the power line of the first switch SL can be flexibly adjusted so as to be close to the ideal power curve by regulating the voltage value of the adjustable voltage VDD generated by the first voltage source 1111 and regulating the resistance value R of the variable resistance unit 1112 (i.e., regulating the node voltage signal Vnode).

Ideally, the voltage value of the adjustable voltage VDD generated by the first voltage source 1111 and the resistance value R of the variable resistance unit 1112 are adjusted in a cooperative manner so as to achieve an ideal power line. The cooperative adjustment here refers to the fact that a decreasing line segment formed by a set of voltage value VDD and resistance value R is connected end-to-end with a decreasing line segment formed by an adjacent set of voltage value VDD and resistance value R, and the two decreasing line segments are connected smoothly as much as possible. For example, the line segment 512 and the line segment 513 in FIG. 5 are connected smoothly. In FIG. 5, only four sets of adjustable voltages VDD and resistance values R are taken as an example. In practical applications, more sets of adjustable voltages VDD and resistance values R can be formed, such that the power line 510 is enabled to be closer to the ideal power curve 520. It can be known from the power line 510 that the power generated by the first switch is close to be constant.

In an embodiment, the first voltage source 1111 in FIG. 4 may be any suitable voltage sources capable of generating an adjustable voltage.

In an embodiment, the variable resistance unit 1112 in FIG. 4 may be any resistance units capable of achieving different impedance values, such as an adjustable rheostat. The variable resistance unit 1112 may also be a series and/or parallel structure formed by a plurality of resistors and switches, and the equivalent impedance of the variable resistance unit 1112 can be regulated by controlling the number of switched-on switches.

Figure 6:
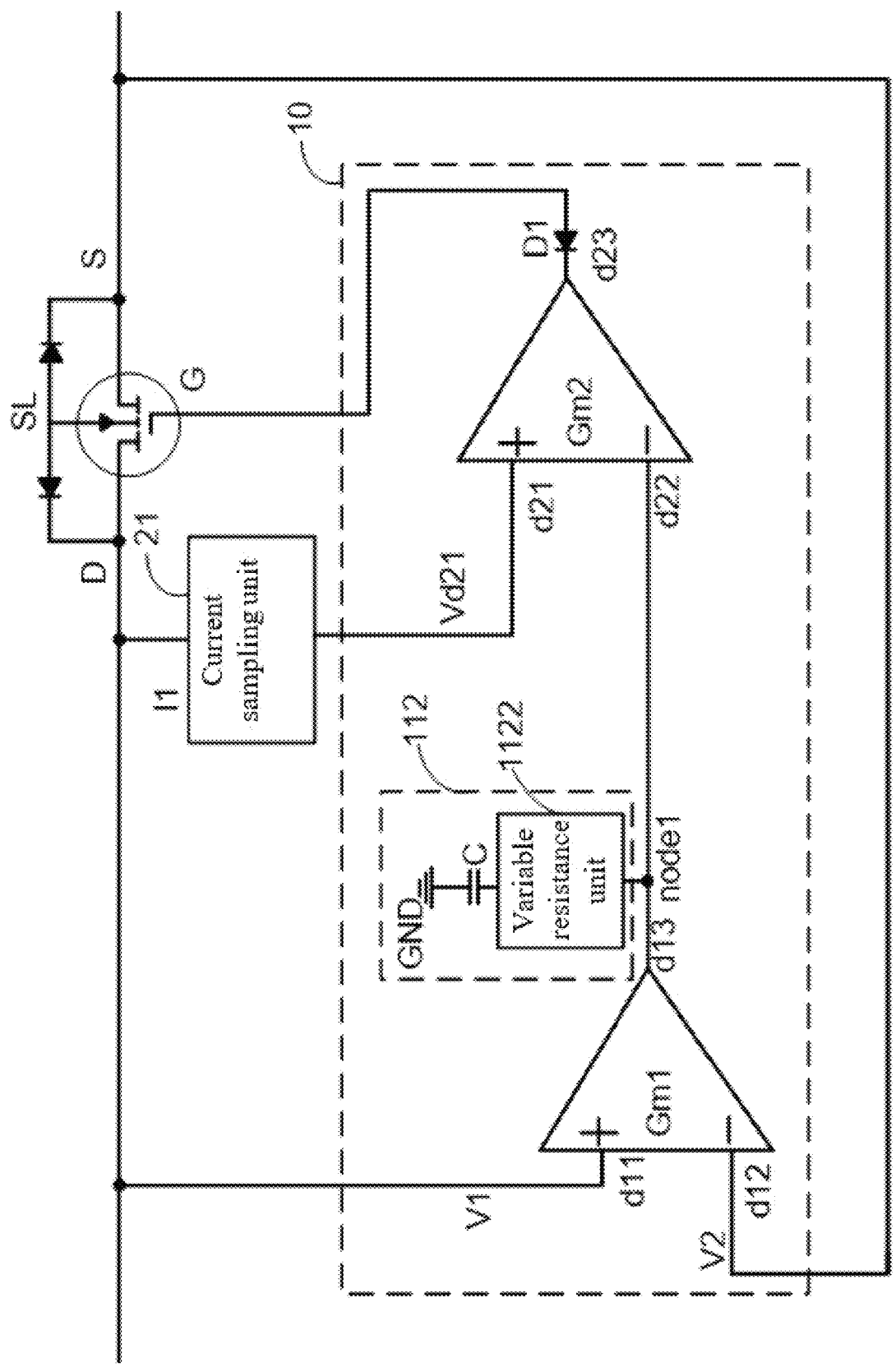
FIG. 6 is a detailed schematic diagram of a power regulation apparatus of a switch in accordance with a second embodiment of the present invention.

In accordance with an embodiment of the present invention, FIG. 6 illustrates a detailed schematic diagram of a power regulation apparatus of a switch in accordance with a second embodiment of the present invention. The node voltage generation unit 11 in FIG. 1 is a node voltage generation unit 112 shown in FIG. 6. The node voltage generation unit 112 includes an energy storage capacitor C, a first terminal of the energy storage capacitor C being grounded GND, and a variable resistance unit 1122 connected between a second terminal of the energy storage capacitor C and the first node node1. The resistance value of the variable resistance unit 1122 is adjustable. Unlike the node voltage generation unit 111 illustrated in FIG. 4, the first current signal IG1 is configured to charge the energy storage capacitor C through the variable resistance unit 1122, and a voltage signal is generated at the first node node1. The node voltage signal Vnode1 can be adjusted by adjusting the resistance value R of the variable resistance unit 1122. Thus, a plurality of decreasing line segments can be formed. The structures and principles of other parts are the same as those of FIG. 4. As such, unnecessary details are not given here.

In accordance with the power regulation apparatus mentioned above, the first current signal IG1 can be regulated by adjusting the transconductance value G1 of the first transconductance unit Gm1, and then the node voltage signal Vnode1 can be regulated. The adjustment of the transconductance value G1 of the first transconductance unit Gm1 may be used in conjunction with the adjustment of the voltage value of the adjustable voltage VDD generated by the first voltage source 1111 and the adjustment of the resistance value R of the variable resistance unit 1112 in the first embodiment shown in FIG. 4. The adjustment of the transconductance value G1 of the first transconductance unit Gm1 may also be used in conjunction with the adjustment of the resistance value R of the variable resistance unit 1122 in the second embodiment shown in FIG. 6. As a result, the power line 510 can be adjusted more flexible and can be enabled to be closer to the ideal power curve 520.

In accordance with the power regulation apparatus as mentioned above, a current characterization signal Vd21 received by the first input terminal d21 of the second transconductance unit Gm2 can be regulated by adjusting a sampling coefficient m of a current sampling unit 21. It can be known according to the characteristics of the transconductance unit and the control principle of the switch control signal generation unit 10 that if the signal of the first input terminal d21 of the second transconductance unit Gm2 is equal to the signal of the second input terminal d22, the regulation of the node voltage signal Vnode1 is indirectly achieved. The adjustment of the sampling coefficient m of the current sampling unit 21 may be used in conjunction with any one of the adjustment of the voltage value of the adjustable voltage VDD generated by the first voltage source 1111, the adjustment of the resistance value R of the variable resistance unit 1112 in the first embodiment shown in FIG. 4, and the adjustment of the transconductance value G1 of the first transconductance unit Gm1. The adjustment of the sampling coefficient m of the current sampling unit 21 may be used in conjunction with any one of the adjustment of the resistance value R of the variable resistance unit 1122 in the second embodiment shown in FIG. 6 and the adjustment of the transconductance value G1 of the first transconductance unit Gm1. As a result, the combined power line 510 can be adjusted more flexible and can be enabled to be closer to the ideal power curve 520.

Referring to FIG. 1, the switch control signal generation unit 10 further includes a first diode D1. The anode of the first diode D1 is connected to the control terminal of the first switch SL, and the cathode of the first diode D1 is connected to the output terminal d23 of the second transconductance unit Gm2. The first diode D1 is used to decouple this circuit from other parallel branches.

In an embodiment of the present application, the power regulation apparatus 100 shown in FIG. 1 is integrated within the same chip unit, thereby meeting the market demand for highly integrated, miniaturized power supply devices, and making the power supply device more convenient to use. Referring to FIG. 6 again, due to the fact that the energy storage capacitor C is configured for energy storage and the first current signal IG1 is only a signal-level current, the energy storage capacitor C may be very small. The energy storage capacitor C is usually only a small picofarad-level capacitor. The power regulation apparatus shown in FIG. 6 may also be integrated into the same chip unit.

In an embodiment of the present application, a switch of the first converter 310 and a switch of the second converter 320 in the dual-battery charging apparatus shown in FIG. 3 as well as the power regulation apparatus 100 are all integrated into the same chip unit to further improve the integration level.

In FIG. 1, as an example, the first input terminal d11 of the first transconductance unit Gm1 serves as a positive input terminal, and the second input terminal d12 of the first transconductance unit Gm1 serves as a negative input terminal. The first input terminal d21 of the second transconductance unit Gm2 serves as a positive input terminal, and the second input terminal d22 of the second transconductance unit Gm2 serves as a negative input terminal. Certainly, the first input terminal d11 of the first transconductance unit Gm1 may also serve as a negative input terminal, and the second input terminal d12 of the first transconductance unit Gm1 may also serve as a positive input terminal. The first input terminal d21 of the second transconductance unit Gm2 may also serve as a negative input terminal, and the second input terminal d22 of the second transconductance unit Gm2 may also serve as a positive input terminal.

Figure 7:
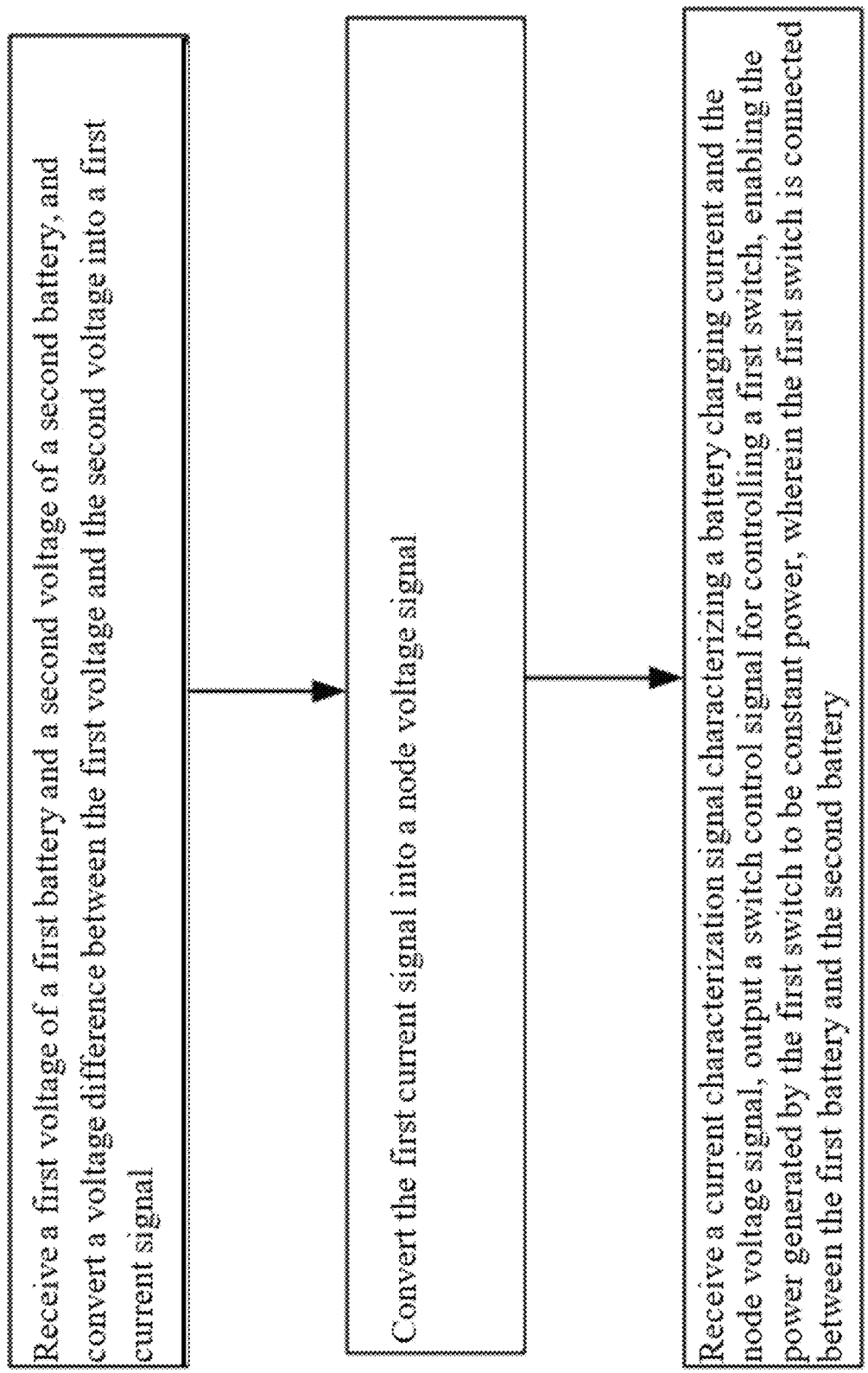
FIG. 7 is a flow diagram of a charging current regulation method in accordance with an embodiment of the present invention.

In an embodiment of the present application, a charging current regulation method is also provided. FIG. 7 illustrates a flow diagram of a charging current regulation method in accordance with an embodiment of the present invention. Please also refer to FIG. 2. The charging current regulation method includes the following steps: in a battery system including a first battery and a second battery connected in parallel, receiving a first voltage of the first battery and a second voltage of the second battery, and converting a voltage difference between the first voltage and the second voltage into a first current signal; converting the first current signal into a node voltage signal; receiving a current characterization signal for characterizing a battery charging current and the node voltage signal; outputting a switch control signal for controlling the first switch, enabling the power generated by the first switch to be constant power, wherein the first switch is connected between the first battery and the second battery.

The principle of achieving the regulation of the charging current (i.e., the current flowing through the first switch) and the power generated by the first switch is the same as that of the power regulation apparatus 100 described above. As such, unnecessary details are not given here.

In an embodiment, the node voltage signal is adjustable. Specifically, in an embodiment of the present application, the step of converting the first current signal into the node voltage signal includes: converting the first current signal into the node voltage signal through the series connection of the first voltage source capable of generating an adjustable voltage and an impedance-adjustable variable resistance unit. Then, the node voltage signal can be adjusted by adjusting the voltage value of the first voltage source and adjusting the resistance value of the variable resistance unit. Ideally, the voltage value of the first voltage source and the resistance value of the variable resistance unit can be adjusted in a cooperative manner so as to achieve an ideal power line and charging current of the first switch.

Specifically, in an embodiment of the present application, the step of converting the first current signal into the node voltage signal includes: converting the first current signal into the node voltage signal through the series connection of a grounded capacitor and the impedance-adjustable variable resistance unit. Then the node voltage signal can be adjusted by adjusting the resistance value of the variable resistance unit.

In an embodiment of the present application, the step of converting the voltage difference between the first voltage and the second voltage into the first current signal includes: converting, by the first transconductance unit, the voltage difference between the first voltage and the second voltage into the first current signal. Then the node voltage signal can be adjusted by adjusting the transconductance value of the first transconductance unit. Moreover, the adjustment of the transconductance value of the first transconductance unit can be used in conjunction with other adjustment schemes.

In an embodiment of the present application, the step of receiving the current characterization signal characterizing the battery charging current includes: obtaining a current sampling signal characterizing the current flowing through the first switch through sampling of a current sampling unit, wherein the current sampling signal characterizes a battery charging current signal. Then the node voltage signal can be adjusted by adjusting a sampling coefficient of the current sampling signal. Moreover, the adjustment of the sampling coefficient of the current sampling signal can be used in conjunction with other adjustment schemes.

In an embodiment of the present invention, in a battery system including a first battery and a second battery connected in parallel, the capacity of one of the batteries is greater than the capacity of the other battery. The charging current regulation method is also suitable for adjusting the charging current of the small-capacity battery.

In an embodiment of the present invention, the second transconductance unit is configured to receive a current characterization signal for characterizing the battery charging current and a node voltage signal, and to output a switch control signal for controlling the first switch.

Finally, it should be noted that the above embodiments are only used to illustrate the technical solution of the present invention rather than limiting. Although the present invention has been described in detail with reference to the foregoing embodiments, it will be appreciated by those of ordinary skill in the art that the technical solutions described in the foregoing embodiments can still be modified or part or all of the technical features thereof can be equivalently replaced; and these modifications or replacements do not make the essence of the corresponding technical solution deviate from the scope of the technical solution of each embodiment of the present invention.

What is claimed is:

1. A power regulation apparatus, comprising:
   a first switch; and
   a switch control signal generation unit comprising:
      a first transconductance unit comprising a first input terminal for receiving a first voltage from a first terminal of the first switch, a second input terminal for receiving a second voltage from a second terminal of the first switch, and an output terminal for being connected to a first node;
      a node voltage generation unit connected to the first node and configured to generate a node voltage signal at the first node; and
      a second transconductance unit comprising a first input terminal for receiving a current characterization signal characterizing a current flowing through the first switch, a second input terminal for being connected to the first node to receive a node voltage signal, and an output terminal for being connected to a control terminal of the first switch.

2. The power regulation apparatus according to claim 1, wherein:
   the node voltage generation unit is configured such that the node voltage signal generated at the first node is adjustable.

3. The power regulation apparatus according to claim 2, wherein the node voltage generation unit comprises:
   a first voltage source configured to generate an adjustable voltage; and
   a variable resistance unit connected between a first voltage source and the first node, and wherein a resistance value of the variable resistance unit is adjustable.

4. The power regulation apparatus according to claim 2, wherein the node voltage generation unit comprises:
   an energy storage capacitor, a first terminal of the energy storage capacitor being grounded; and
   a variable resistance unit connected between a second terminal of the energy storage capacitor and the first node, and wherein a resistance value of the variable resistance unit is adjustable.

5. The power regulation apparatus according to claim 4, wherein:
   the energy storage capacitor is a picofarad capacitor.

6. The power regulation apparatus according to claim 4, wherein:
   a transconductance value of the first transconductance unit is adjustable.

7. A dual-battery charging apparatus, comprising:
   a first converter comprising an input terminal for receiving a bus voltage, and an output terminal connected to a first battery; and
   a second converter comprising an input terminal for receiving the bus voltage, and an output terminal connected to the first battery, wherein the output terminal of the first converter and the output terminal of the second converter are connected to a second battery via a power regulation apparatus comprising:
   a first switch; and
   a switch control signal generation unit comprising:
      a first transconductance unit comprising a first input terminal for receiving a first voltage from a first terminal of the first switch, a second input terminal for receiving a second voltage from a second terminal of the first switch, and an output terminal for being connected to a first node;
      a node voltage generation unit connected to the first node and configured to generate a node voltage signal at the first node; and
      a second transconductance unit comprising a first input terminal for receiving a current characterization signal characterizing a current flowing through the first switch, a second input terminal for being connected to the first node to receive a node voltage signal, and an output terminal for being connected to a control terminal of the first switch.

8. The dual-battery charging apparatus according to claim 7, wherein:
   the first converter is a step-down converter.

9. The dual-battery charging apparatus according to claim 7, wherein:
   the second converter is a switched capacitor converter.

10. A charging current regulation method, comprising:
    in a battery system comprising a first battery and a second battery connected in parallel, receiving a first voltage of a first battery and a second voltage of a second battery, and converting a voltage difference between the first voltage and the second voltage into a first current signal;
    converting the first current signal into a node voltage signal; and
    receiving a current characterization signal characterizing a battery charging current and the node voltage signal and outputting a switch control signal for controlling a first switch so that power generated by the first switch is constant, wherein the first switch is connected between the first battery and the second battery.

11. The charging current regulation method according to claim 10, wherein:
    the node voltage signal is adjustable.

12. The charging current regulation method according to claim 11, wherein:
    the first current signal is converted into the node voltage signal through a series connection of a first voltage source capable of generating an adjustable voltage and an impedance-adjustable variable resistance unit.

13. The charging current regulation method according to claim 12, wherein:
the node voltage signal is adjusted by adjusting a voltage value of a first voltage source and adjusting a resistance value of the impedance-adjustable variable resistance unit.

14. The charging current regulation method according to claim 10, wherein:
the node voltage signal is adjustable, and wherein the first current signal is converted into the node voltage signal through a series connection of a grounded capacitor and an impedance-adjustable variable resistance unit.

15. The charging current regulation method according to claim 14, wherein:
a resistance value of the variable resistance unit is adjusted, and the node voltage signal is adjusted.

16. The charging current regulation method according to claim 10, wherein:
the node voltage signal is adjustable, and wherein the first current signal is converted into the node voltage signal through a series connection of a first voltage source capable of generating an adjustable voltage and an impedance-adjustable variable resistance unit, and wherein the node voltage signal is adjusted by adjusting a voltage value of a first voltage source and adjusting a resistance value of the variable resistance unit, and wherein the voltage difference between the first voltage and the second voltage is converted, by a first transconductance unit, into the first current signal, and wherein a transconductance value of the first transconductance unit is adjusted.

17. The charging current regulation method according to claim 10, wherein:
the node voltage signal is adjustable, and wherein the first current signal is converted into the node voltage signal through a series connection of a grounded capacitor and an impedance-adjustable variable resistance unit, and wherein a resistance value of the variable resistance unit is adjusted, and the node voltage signal is adjusted, and wherein the voltage difference between the first voltage and the second voltage is converted, by a first transconductance unit, into the first current signal, and wherein a transconductance value of the first transconductance unit is adjusted.

* * * * *